Jan. 20, 1970  H. A. JENSEN ET AL  3,490,323
PACKAGE TRIMMER

Filed June 5, 1967  9 Sheets-Sheet 1

INVENTORS
HANS A. JENSEN
MELVIN M. LAYMAN
BY Dreist Lockwood, Greenawalt & Dewey
ATT'YS.

Jan. 20, 1970     H. A. JENSEN ET AL     3,490,323
PACKAGE TRIMMER
Filed June 5, 1967
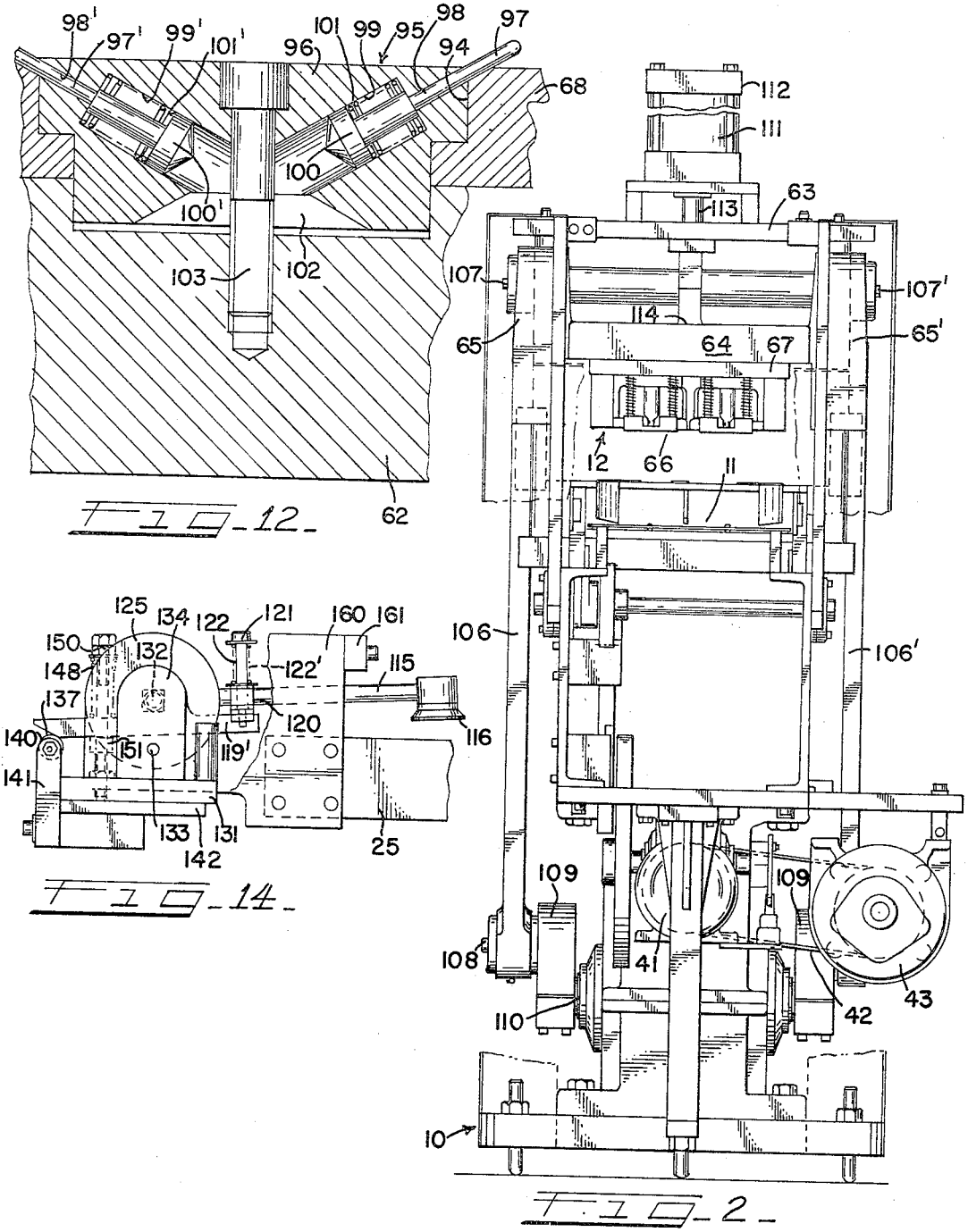
INVENTORS
HANS A. JENSEN
MELVIN M. LAYMAN
BY *Greist, Lockwood, Greenawalt & Dewey*
ATT'YS.

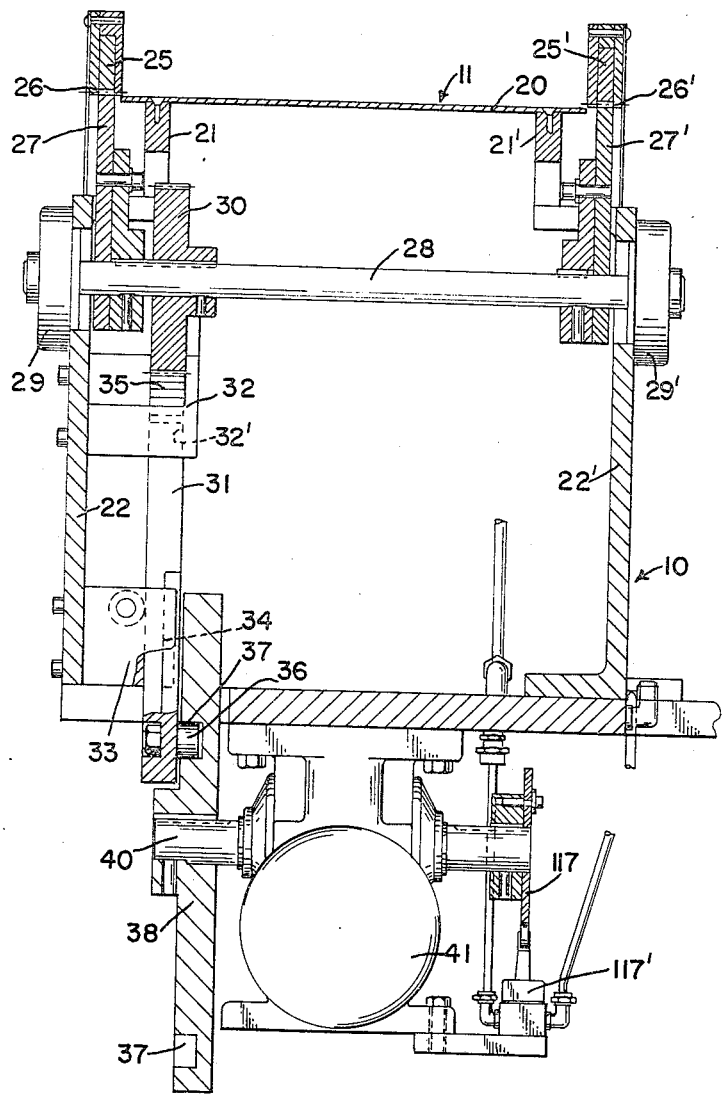

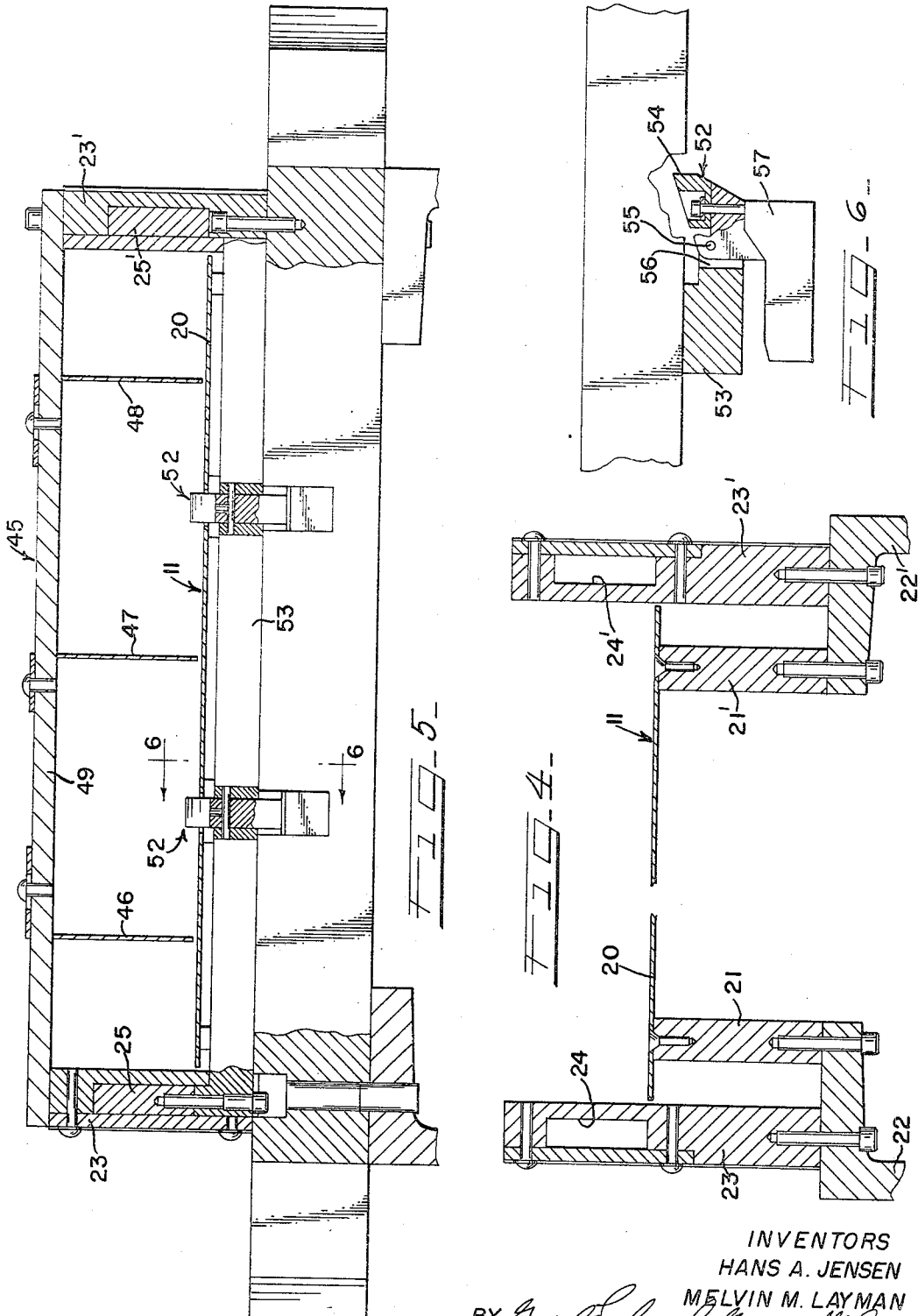

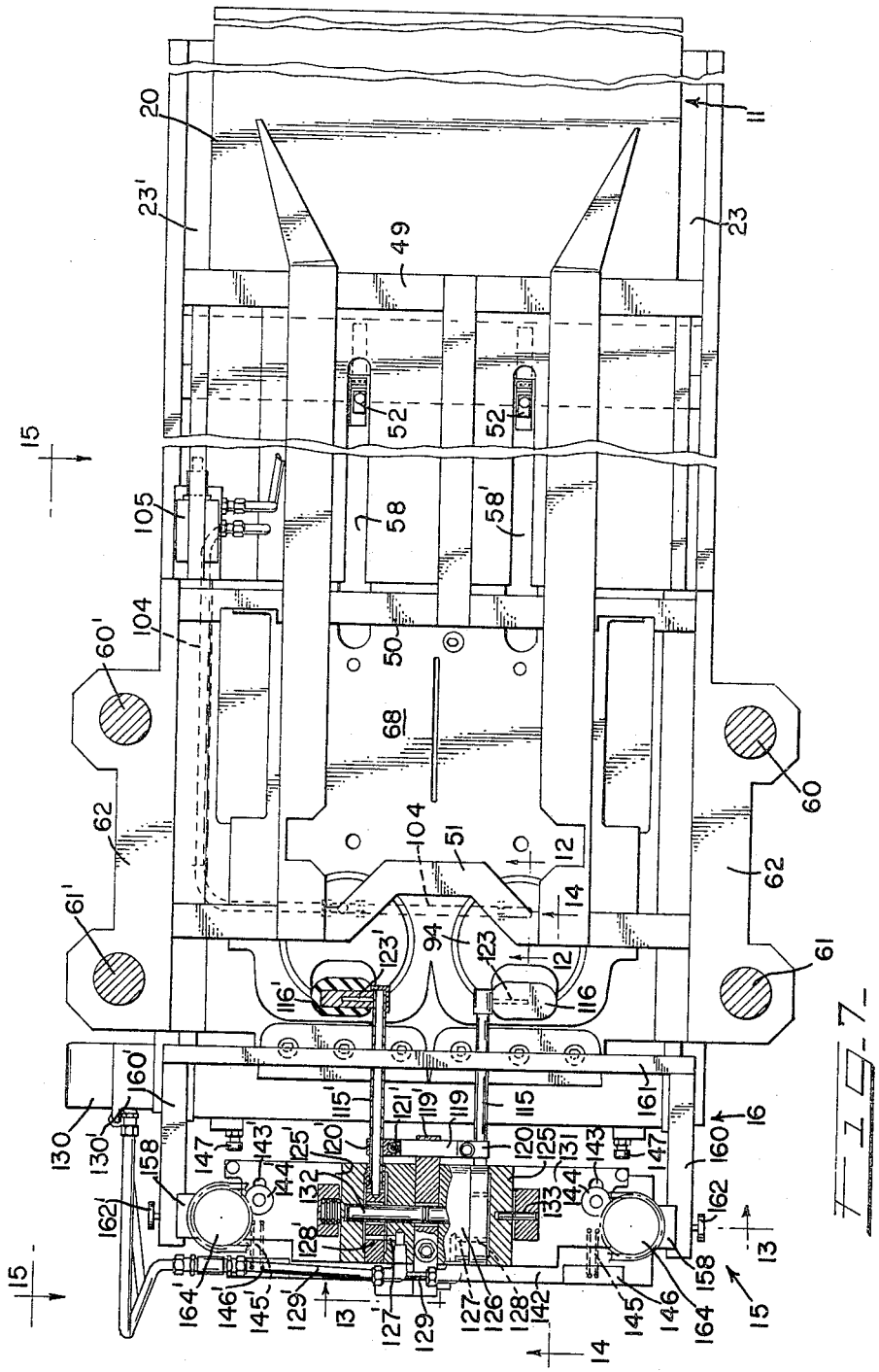

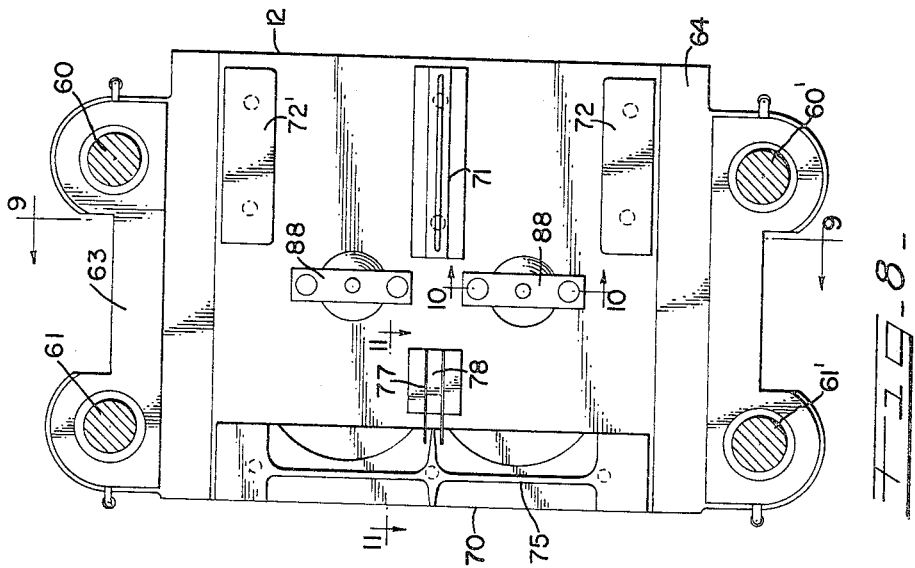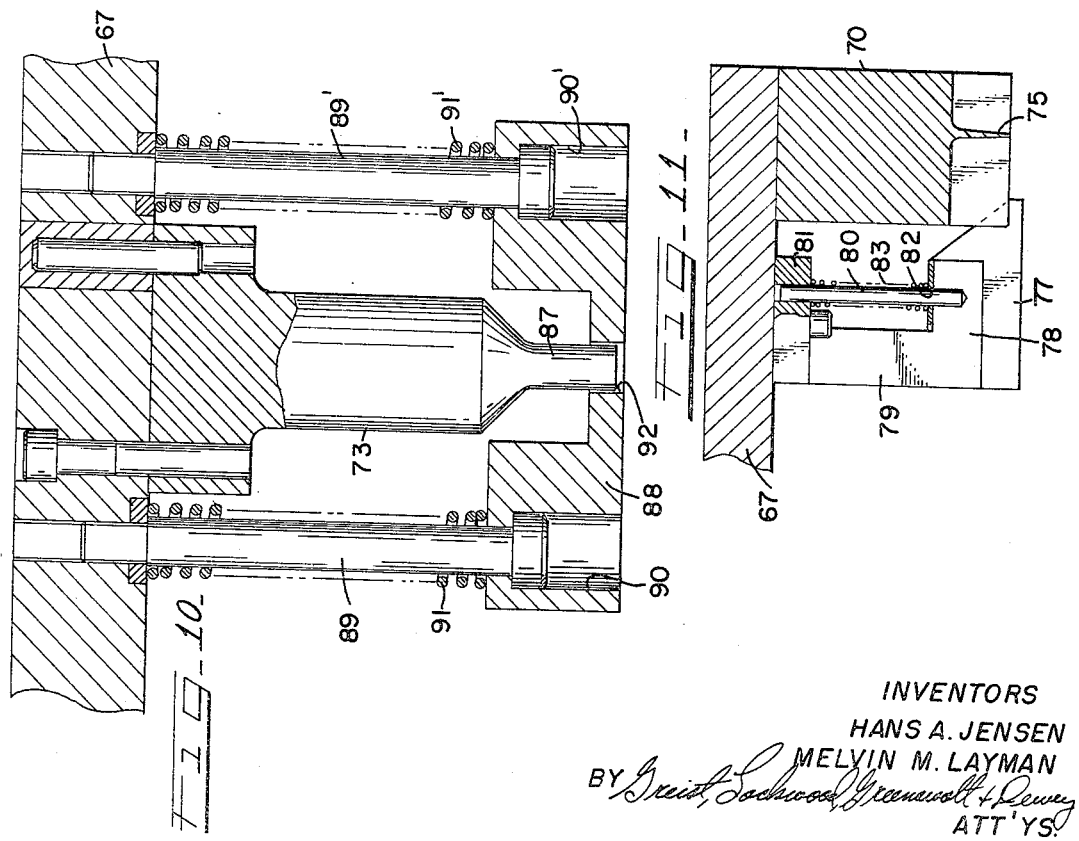

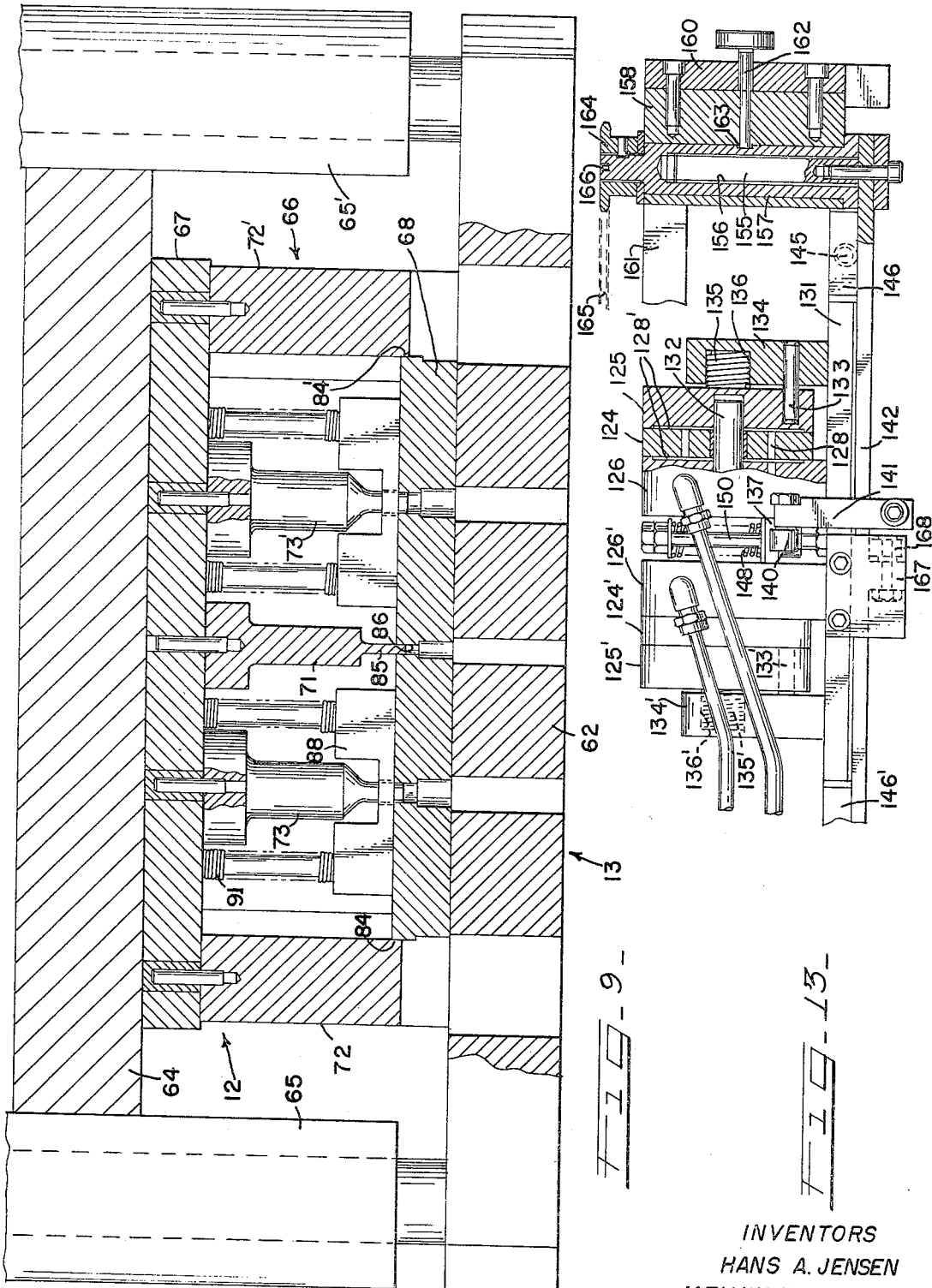

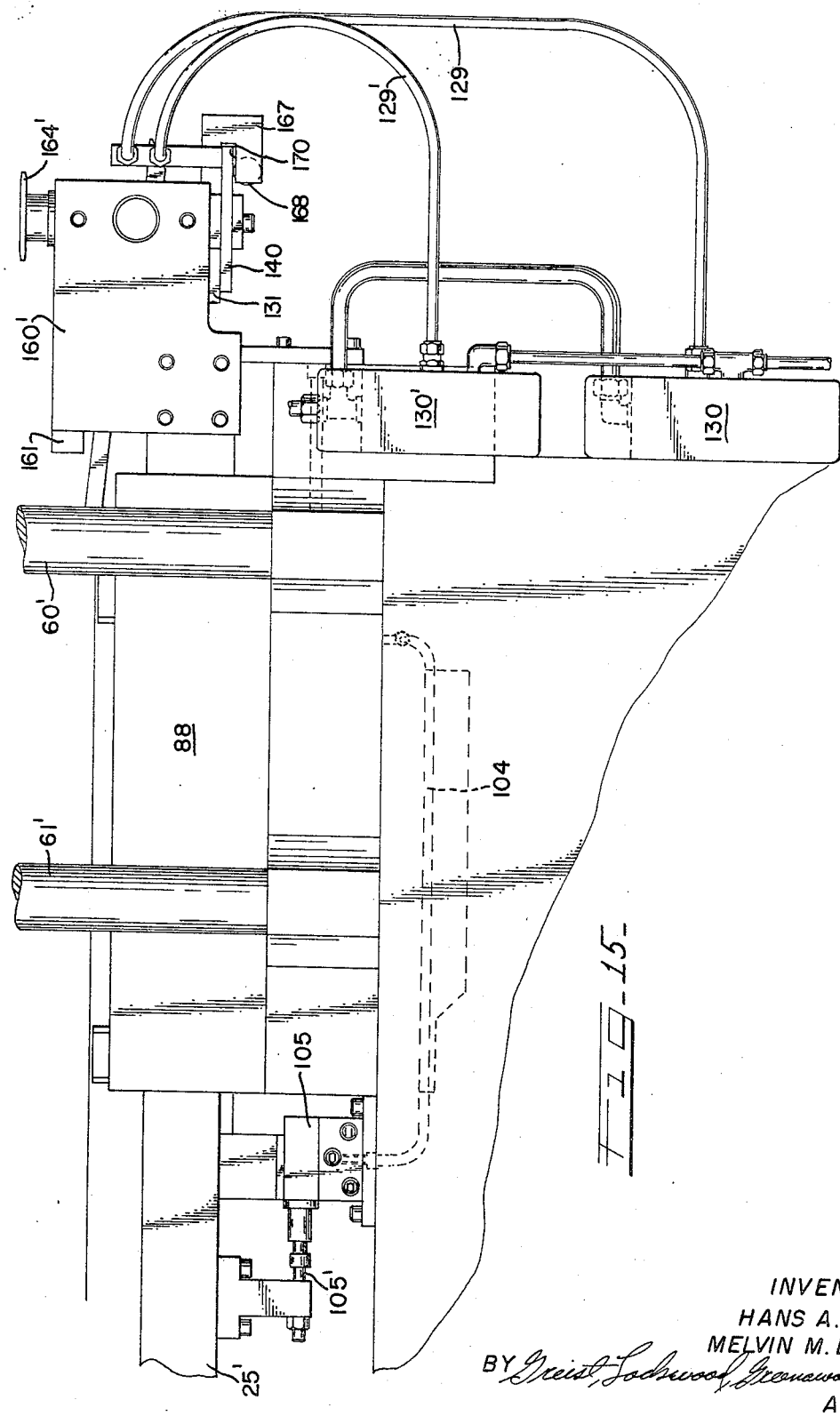

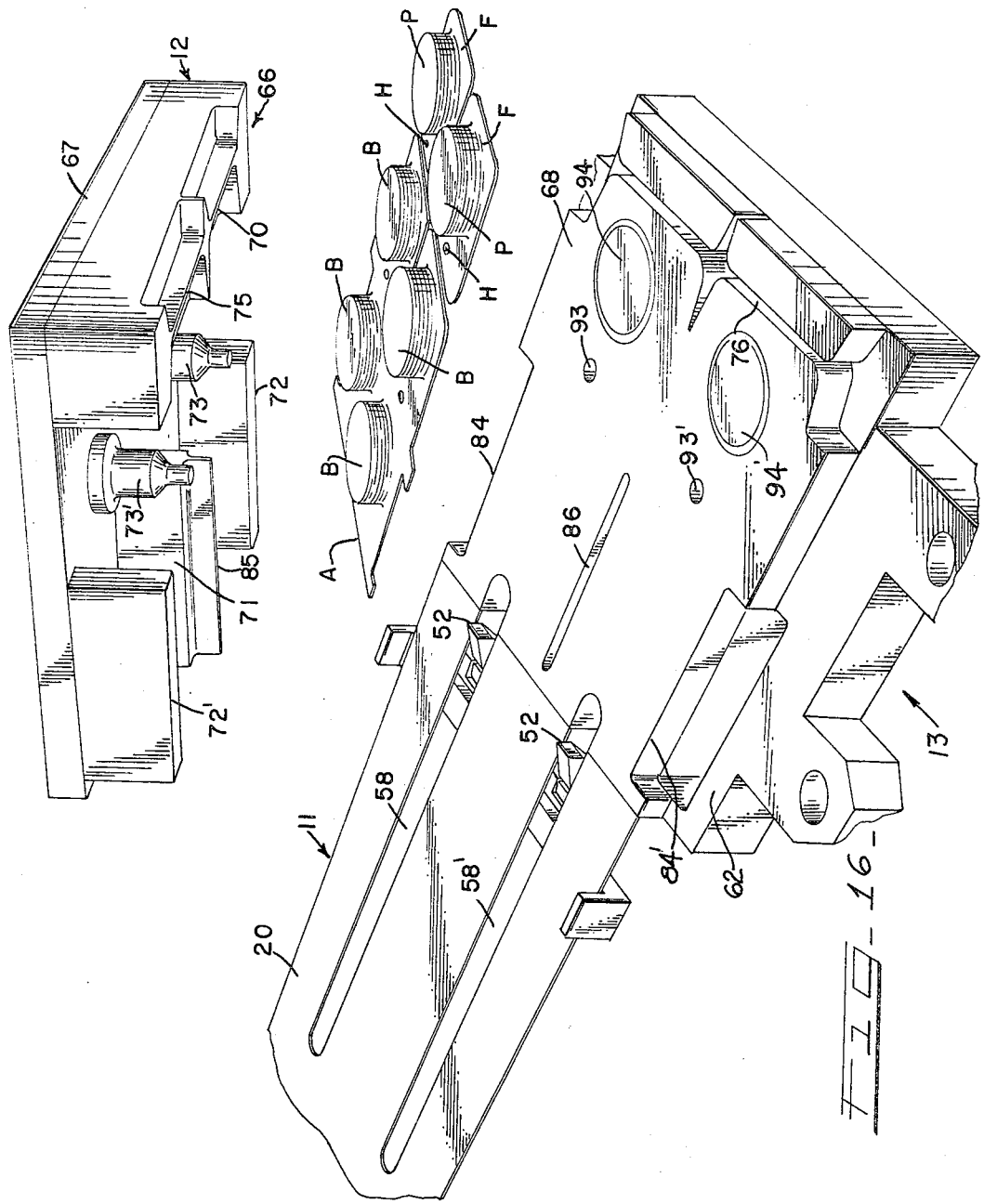

United States Patent Office 3,490,323
Patented Jan. 20, 1970

3,490,323
PACKAGE TRIMMER
Hans A. Jensen, Madison, and Melvin M. Layman, Waunakee, Wis., assignor to Oscar Mayer & Co., Inc., Chicago, Ill., a corporation of Illinois
Filed June 5, 1967, Ser. No. 649,406
Int. Cl. B26d *5/08, 7/06*
U.S. Cl. 83—112                               19 Claims

ABSTRACT OF THE DISCLOSURE

An apparatus for separating and simultaneously trimming packages which are formed in multiple units comprising, for example, two rows of packages with the packages arranged in transversely aligned pairs and connected by flange forming web portions surrounding the base of each package. The apparatus comprises an upright frame with a horizontally disposed table on which successive multiple package assemblies are advanced to an anvil die at the discharge end of the table which has a co-operating cutting die assembly mounted for vertical reciprocation above the same with knives for cutting the web around each package so as to leave a flange formation extending about each product enclosing portion and package removing arms mounted for swinging movement on a horizontally reciprocating carriage at the discharge end of the table with vacuum cups operative in timed relation to the movement of the cutting die assembly to pick up and discharge successive end-most packages as they are cut loose by operation of the knives on the cutting die assembly.

---

This invention relates to the packaging of products in preformed plastic container members and is more particularly concerned with improvements in a cutting and trimming apparatus for separating individual packages from a plurality thereof which have been formed in connected relation.

In the packaging of certain products it has been found desirable to fabricate a plurality of the packages in a multiple unit assembly and subsequently separate the individual packages from the assembly by cutting and trimming operations. An example of a type of package which lends itself to this procedure is disclosed in copending application Ser. No. 445,579, filed Apr. 5, 1965, and an apparatus for forming or closing such a multi-unit package assembly is disclosed in copending application Ser. No. 626,297, filed Mar. 27, 1967. In fabrication the package assembly, plastic sheets are preformed or molded to provide a series of connected container body elements in which the product, for example, sliced luncheon meat, or any similar material, is initially placed. A preformed sheet of closure forming panels which subsequently become the package bottoms is assembled with the body elements and sealed to the flange formations surrounding each container body element. The package assembly, when completely formed, comprises a plurality of spaced packages which are integrally connected by a composite flange formation, the latter extending about each individual package when the multi-unit assembly is divided by cutting between the body elements and trimming along the outside edges.

A general object of the present invention is to provide an apparatus for cutting apart and trimming individual packages which are formed in multiple units so that the body of each package projects on one side of a flange forming composite sheet extending between the packages and about the outer edges thereof.

A more specific object of the invention is to provide a cutting and trimming apparatus for separating individual packages from multiple unit assemblies in which the packages are connected by flange forming web portions wherein successive multiple unit assemblies in which the packages are in transverse alignment are advanced between a pair of cutting and trimming dies, one of which is reciprocated relative to the other so as to be operative on the leading end of each multiple unit assembly to trim three sides of each of the leading packages and with each successive advance of the assembly, simultaneously to sever and trim the fourth side of each of the packages in the previously trimmed row so as to free the individual packages from the assembly in neatly trimmed condition for marketing.

A further object of the invention is to provide a cutting and trimming apparatus for separating packages from connected assemblies thereof which includes a horizontally disposed feed table with associated mechanism for intermittently advancing multiple unit package assemblies to a cutting and trimming station where a reciprocating cutting and trimming die operates to trim around successive leading packages in the assembly so as to free the same for removal by package gripping arms mounted on a reciprocating carriage which is operated in timed relation to the movement of the assembly advancing mechanism and the cutting and trimming die.

Another object of the invention is to provide in an apparatus of the type described means for positioning the successive leading packages in each assembly thereof in the path of the cutting and trimming die so as to cut and trim each package to uniform dimensions and shape.

A further object of the invention is to provide in an apparatus of the type described package gripping arms which are mounted so as to enable the same to be adjusted to adapt the apparatus for handling packages a varying size.

These and other objects and advantages of the invention will be apparent from a consideration of the package severing and trimming machine which is shown by way of illustration in the accompanying drawings wherein:

FIGURE 2 is an end elevation at the infeed end of the machine with portions broken away;

FIGURE 3 is a cross section taken on the line 3—3 of FIGURE 1, to an enlarged scale and with portions broken away;

FIGURE 4 is a cross section taken on the line 4—4 of FIGURE 1, to an enlarged scale and with portions broken away;

FIGURE 5 is a cross section taken on the line 5—5 of FIGURE 1, to an enlarged scale and with portions broken away;

FIGURE 6 is a fragmentary section taken on the line 6—6 of FIGURE 5;

FIGURE 7 is a horizontal section taken on the line 7—7 of FIGURE 1 to an enlarged scale and with portions broken away;

FIGURE 8 is a view taken on the line 8—8 of FIGURE 1, to an enlarged scale, the view showing the bottom face of the top trimming die;

FIGURE 9 is a cross section taken on the line 9—9 of FIGURE 8, to an enlarged scale;

FIGURE 10 is a fragmentary section taken on the line 10—10 of FIGURE 8, to an enlarged scale;

FIGURE 11 is a fragmentary section taken on the line 11—11 of FIGURE 8, to an enlarged scale;

FIGURE 12 is a fragmentary section taken on the line 12—12 of FIGURE 7, to an enlarged scale;

FIGURE 13 is a partial section taken on the line 13—13 of FIGURE 7, to an enlarged scale;

FIGURE 14 is a fragmentary section taken on the line 14—14 of FIGURE 7, to an enlarged scale;

FIGURE 15 is a partial side elevational view taken on the line 15—15 of FIGURE 7, to an enlarged scale; and FIGURE 16 is an exploded perspective view, partly schematic, illustrating certain of the operations performed by the machine.

Figure 1:
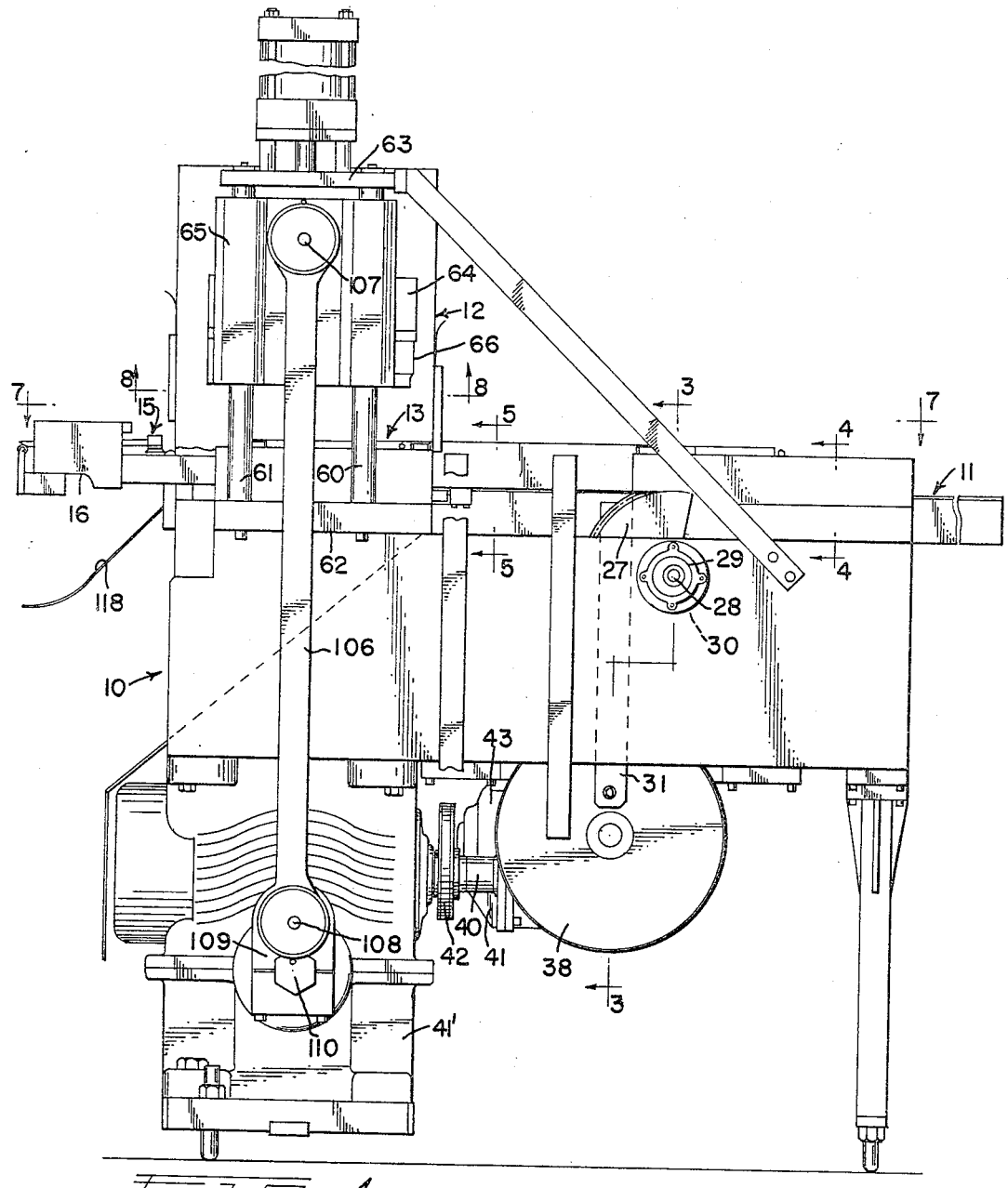
FIGURE 1 is a side elevation of a machine which incorporates therein the principal features of the invention, portions of the machine being broken away or omitted.

Referring to FIGURES 1 and 2 particularly, there is illustrated a machine for trimming and cutting apart packages which are initially formed in multiple units, that is, a plurality of the packages are formed at one time with the packages connected by web-like portions, one of which is shown in part at A in FIGURE 16. Each multiple package assembly A comprises, for example, two rows of the packages P with a predetermined number of packages in each row and with the packages aligned transversely in pairs and connected by web portions which provide, when cut and trimmed, outwardly extending flanges F surrounding the base of each package. The packages P which are illustrated are of the type disclosed in copending application Ser. No. 445,529, filed Apr. 5, 1965, and they are formed in connected multiple assemblies A, each comprising two rows thereof, by a machine of the type illustrated in copending application Ser. No. 626,297, filed Mar. 27, 1967. In the package assembly A which is adapted to be cut apart by the present machine each such assembly A comprises a plurality of cup-like plastic container bodies B which are formed or shaped from sheet material, the bodies B being spaced in the sheet so as to provide a relatively wide connecting web which is adapted to form a flange extending about the mouth of each body when the mouth thereof is closed, after the product is placed therein, by sealing thereto a preformed closure panel which is offset from a co-operating flange forming sheet and which telescopes within the mouth of the container body. The packages in each assembly A, when completed, are connected by integral flange forming web portions and the latter are adapted to be cut around the margin of each container body so as to leave a flange F extending around the base of each package which extends outwardly of the telescoping closure panel, with one side thereof wider than the other three sides so as to provide space for a label (not shown) to be secured thereon and in which there is punched a pegboard hold H enabling the package to be suspended for display. The present machine is adapted to receive successive package assemblies A and to advance the same to a cutting and trimming station at which a reciprocating die operates to cut and trim successive leading pairs of the packages during each reciprocation thereof, after which the leading packages are discharged from the machine.

The machine is supported on an upright frame 10 (FIGURES 1, 2 and 3) which is constructed to provide an elongate, horizontally disposed table 11 extending lengthwise of the machine from the infeed end (FIGURE 2) to the outfeed or discharge end where the individual packages P are removed in pairs, from beneath a reciprocating cutting and trimming die assembly 12 which is operative above a co-operating anvil die 13, by a pickup arm assembly 15 which is supported on a carriage forming frame 16 mounted for horizontal reciprocation in a path extending above the top face of the anvil die 13 at the end of the table 11.

The table 11 (FIGURES 2, 3, 5 and 7) at the infeed end of the machine is formed by a horizontally disposed plate 20 on which the package assembly A is initially placed. The plate 20 is supported on side bars 21 and 21′ which are carried on the top flanges of laterally spaced, parallel, upright side frame plates 22 and 22′ forming part of the machine frame 10. The work supporting plate 20 extends between two longitudinally extending, guideway forming members 23 and 23′ (FIGURES 3, 4 and 5) which are provided with tracks 24 and 24′ for receiving slide bars 25 and 25′ on the ends of which the reciprocating carriage 16 is mounted at the outfeed or discharge end of the machine. The bars 25 and 25′ are provided with rack teeth 26 and 26′ on the bottom edges thereof which are engaged by oscillating segmental gears 27 and 27′ carried on the opposite ends of a rock shaft 28 which is journaled in suitable bearings 29 and 29′ mounted on the upstanding frame plates 22 and 22′. The rock shaft 28 carries a gear 30 positioned to engage with a vertically extending rack 31. The rack 31 is reciprocably mounted in vertically spaced, slide bearings 32 and 33 which are mounted on the inside face of the one side frame member 22. The uppermost slide bearing 32 has a suitable guideway 32′ for receiving the rack bar 31 and the lowermost bearing 33 has a T-shaped guideway 34 for receiving and guiding a correspondingly shaped lower section of the bar 31. The slide bar 31 has pinion engaging teeth 35 at the top thereof which engage with the pinion 30 on the rock shaft 28. The slide bar 31 carries at its lower end a cam roller 36 which engages in a cam track 37 in a plate cam 38 mounted on the drive shaft 40 which is driven in a conventional manner from a speed reducer 41 (FIGURES 2 and 3) having a chain and sprocket drive connection indicated at 42 with a motor 43. The drive shaft 40, speed reducer 41 and motor 43 are all mounted in a suitable manner on the lower portion of the frame 10 as shown in FIGURES 1 to 3.

The package assembly A is guided along the plate 20 by a guide assembly 45 (FIGURES 5 and 7) which comprises vertically disposed, laterally spaced guide plates 46, 47 and 48 depending from the cross bars 49, 50 and 51 which are mounted on the side guideway forming plate members 23 and 23′. The plates 46 and 48 are spaced on opposite sides of the center plate 47 a distance equal to the transverse dimension between the outermost side faces of the package bodies so that the body portions of the two rows of packages P in an assembly A are guided by the plates as they are advanced to cutting and trimming position between the die assemblies 12 and 13.

The package assembly A is advanced toward the trimming and cutting station beneath the die assembly 12 by a pair of pawls 52 (FIGURES 5 and 6) carried in laterally spaced relation on a cross bar 53 extending between the slide bars 25 and 25′ of the carriage 16. Cross bar 53 which moves below the plate 20 forms a pivot bar for the pawl assemblies 52. Each pawl assembly 52 comprises a nose forming portion 54 which is pivoted at 55 on bearing forming ears 56 on the cross bar 53. A counterweight 57 extends below the pawl nose 54 and is arranged relative to the pivot 55 so as to normally hold the pawl nose 54 in operative position for engaging the package assembly and carrying the same forward as the slide bars 25 and 25′ are moved in the direction of the discharge end of the machine. The counterweight 57, of course, permits the pawl nose to be swung down when the slide bars 25 and 25′ are retracted and to pass beneath the trailing portion of the package assembly. The plate 20 forming the floor of the table 11 is slotted at 58 and 58′ (FIGURE 7) to accommodate the movement of the pawls 52.

The package assembly A is advanced so as to bring the leading end thereof beneath the cutting and trimming die assembly 12 which is mounted for reciprocation on four vertically disposed, longitudinally and laterally spaced guide bars 60, 61 and 60′, 61′ (FIGURES 1 and 7). The pairs of guide bars 60, 61 and 60′, 61′ are arranged on opposite sides of the machine and extend upwardly of bolster plate 62 with a connecting plate 63 at the top thereof. The die assembly 12 includes a supporting block 64 which is generally H-shaped with side members 65 and 65′ having guideway forming apertures for receiving the vertically disposed guide bars 60, 61 and 60′, 61′ with suitable bushings to permit sliding movement of the assembly. A plurality of punches 66 are mounted on the lower face of the support 64 and extend downwardly from a mounting plate 67 for co-operation with a die plate 68 (FIGURES 8, 9 and 16), the upper surface of which is on the level of the top of table 11.

The package cutting punch elements 66 (FIGURES 8, 9 and 16) carried on the mounting plate 67 comprise a forward punch 70, a center shear member 71, side trim members 72 and 72′, and a pair of hole punches 73 and 73′. The forward punch 70 has its lower face recessed so as to provide a cutting blade having a crosslike configuraton 75 (FIGURES 8 and 11) providing paired, back-to-back or oppositely facing, generally U-shaped cutting edges which define the leading portion of two of the packages P and the trailing portion of the two preceding packages. The die plate 68 has a cutting slot 76 in the form of a cross for co-operation with the blade 75. A stripper device (FIGURES 8 and 11) is associated with the forward shear member which comprises a stripper plate 77 bent into U shape and positioned in straddling relation on the bottom leg 78 of an L-shaped bracket 79, the longer upstanding leg of which is attached to the mounting plate 67. A supporting guide pin 80 extends between the lower leg 78 and a portion 81 of the base of the bracket 79 and forms a guide for the stripper plate 77 which is apertured at 82 to hold it on the guide rod 80 and which is held in its lowermost position by a compression spring 83. The U-shaped plate 77 is arranged so as to bear against the flange forming portions of the two adjoining packages in the package assembly which is positioned for a cuttng operation. The side edges of the package assembly are trimmed by the two side trim members 72 and 72' which have their iner edges co-operating with cutting edges 84, 84' on the die 68 as shown in FIGURE 9. The package assembly A is cut down the center by the center shear member 71 which has a bottom shear blade 85 operative in a co-operating slot 86 in the die 68. The hole punches 73 and 73' are positioned to punch the hole H in the label forming portion of the flange of each of the packages and each of these devices comprises a hole forming punch member 87 (FIGURES 9 and 11) and a stripper plate 88 which is suported in vertically sliding relation on a pair of depending pins 89 and 89' (FIGURE 10) which extend downwardly from the mounting plate 67 with the headed ends seated in enlarged portions of bores 90 and 90' and which carry compression springs 91 and 91'. The plate 88 has a punch accommodating aperture 92 and is normally held in its lowermost position by operation of the springs 91 and 91' so as to engage the package assembly in the label forming area of the flange of each of the transversely aligned packages. The die plate 68 is provided with apertures 93 and 93' for co-operation with the punch members 87.

In order to insure that the packages are properly located for operation of the cutting elements on the assembly 12 an arrangement is provided in the die 68 beneath each of the leading packages so as to properly center or position the same. The die 68 has mounted in recesses 94 (FIGURE 7) located at the proper position relative to the punch 70 package locating assemblies 95 (FIGURE 12) each of which comprises a mounting plate 96 having a pair of pins 97, 97' slidingly supported in inclined relation in guideway forming slots 98 and 98' which communicate with cylinder forming bores 99 and 99' of enlarged diameter. The pins 97 and 97' extend after the fashion of piston rods from piston forming members 100 and 100' which are normally urged to a position to retract the pins 97 and 97' by compression springs 101 and 101' which are trapped in the bores 99 and 99'. The chamber forming bores 99 and 99' are in communication with a chamber 102 in the top of the bolster plate 62 which is recessed on the top face and held in the die recess 94 by a bolt 103. A pressure line 104 (FIGURE 7) which is connected to a suitable means for supplying compressed air so as to operate the pins 97 and 97' under the control of valve 105 (FIGURES 7 and 15) which is mounted on the side frame member 22' and operated by engagement therewith of adjustable bumper member 105' (FIGURE 15), which is mounted on slide bar 25'. The pins 97 and 97' are adapted to engage oppositely disposed portions of the narrow side wall connecting the flange and the closure panel which is telescoped into the body of each package so that each package assembly has a relatively shallow circular recess formed in the base thereof into which the pins will extend when projected by actuation of the valve 105 in response to movement of slide bar 25' which advances with the package assembly.

The cutting die assembly 12 is reciprocated in a vertical path on the supporting posts 60, 61 and 60', 61' by vertically disposed connecting rods 106 and 106' (FIGURES 1 and 2) which are arranged on opposite sides of the machine. The upper ends of connecting rods 106 and 106' are pivoted at 107 and 107' to the die support 64 and their lower ends are pivotally connected at 108 and 108' to crank members 109 and 109' mounted on the ends of the cross drive shaft 110 of speed reducer 41' which is driven by electric motor 43. A vacuum cylinder 111 is mounted on the connecting plate 63 and has its piston rod 113 coupled at 114 with the cutting die support 64. The cylinder 111 is connected to a vacuum line (not shown) and the vacuum is controlled so as to balance some of the weight of the cutting die assembly 12.

To insure that the packages, when cut loose from the assembly, will be ejected from the machine, the reciprocably mounted pickup arm assembly 15 (FIGURES 1, 7 and 13 to 15) is provided which is supported on the carriage forming frame 16 mounted on the end portions of the slide bars 25 and 25' at the discharge end of the machine as shown in FIGURE 1. The assembly 15 includes a pair of oscillatable arms 115 and 115' on the free ends of which vacuum cups 116 and 116' are mounted so that as the two leading end packages are freed by upward movement or retraction of the cutting head assembly 12 the carriage 16 moves toward the discharge end of the machine, and at the end of this movement the arms 115 and 115' swing down until they engage the cups 116 and 116' with the top surfaces of the two end packages P. At this time the cam plate 117 on shaft 40 engages vacuum valve 117' shown in FIGURE 3, securing cups 116, 116' to the package tops and at the same time engages vacuum locks on oscillating arms at package height. Upon reverse movement of the carriage 16, the arms 115 and 115' slide the two end packages along the die surface, without lifting, thereby providing uniform movement to packages of various heights. At the end of the reverse movement the cam plate 117 releases the vacuum to the cups and to the locks, allowing the packages to drop into chute 118 and the arms 115 to return to their upward position. The two arms 115 and 115' are connected to opposite ends of a cross bar 119 in an identical manner and the cross bar is mounted at its center on a cam arm 119'. Each arm 115 and 115' is fixed to a small block 120 and 120' and the blocks 120 and 120' are slidably mounted on headed pins 121 and 121', the latter extending upwardly of the end of the cross bar 119 and having compression springs 122 and 122' mounted thereon which engage the head of the pin 121 and 121' at the top end and the top of the blocks 120 and 120' at the bottom end. The springs 122 and 122' normally hold the slide blocks 120 and 120' against the top face of the cross bar 119 but permit limited upward movement of the arms 115 and 115' relative to the bar 119. The arms 115 and 115' are hollow and form passageways which connect the passageways 123 and 123' for applying vacuum to the cups 116 and 116'. Each of the arms 115 and 115' (FIGURES 7, 13 and 14) extends from a circular plate 124 and 124' which is mounted on a pin 132 extending outwardly from a pair of upstanding bearing members 126, 126' with the center bearing members 126, 126' having passageways 127, 127' connecting with circular passageways 128, 128' in the plates 124, 124' which in turn connect with the tubular arms 115, 115' and with vacuum chambers 128' recessed into bearing members 126 and 126' and into semifloating vacuum brake shoes 125 and 125'. When vacuum is applied to the cups, the shoes will move inwardly, clamping circular plates 124, 124' against bearing members 126, 126', locking them at a height corresponding to the height of individual packages. Conduits 129 and 129′ are connected with the passageways 127 and 127′ in the center bearings 126 and 126′ and provide connections with a vacuum line through valves 130 and 130′ (FIGURES 7 and 15). The center bearings 126 and 126′ are upstanding from a mounting plate 131 and floating brake shoes 125, 125′ and the support plates 124, 124′ for the arms 115 are mounted on two pivot pins 132 extending between the center bearings 126, 126′ and the associated brake shoes 125, 125′. Brake shoes 125, 125′ are supported above the mounting plate 131 on pins 133, 133′ (FIGURES 7 and 13) extending inwardly of brackets 134, 134′ which are fixed on the mounting plate 131 and have springs 135, 135′ seated in recesses 136, 136′ which urge the brake shoes 125, 125′ into sealing engagement with the arm carrying plate members 124, 124′. The cam arm 119′ is rotatably mounted on the pivot pin 132 with the cross car 118 connected at one end and with the opposite end beveled at 137 and extending for engagement with a cam roller 140 carried on the upstanding leg of an L-shaped bracket 141 which has its other leg secured on a base plate 142 on which the mounting plate 131 is slidably supported.

The mounting plate 131 is provided with a pair of elongate slots 143 and 143′ (FIGURE 7) through which headed guide pins 144 and 144′ extend so as to provide a limited sliding connection with the base plate 142. A pair of compression springs 145 and 145′ are seated at one end in sockets in the edge of the plate 131 adjacent the pins 144 and 144′ and at the other end in sockets in retainer blocks 146 on the base plate 142 and serve to normally hold the mounting plate 131 in the position shown in FIGURES 7 and 14. Springs 145 permit the mounting plate 131 to move towards the discharge end of the machine a limited distance as the carriage 16 is moved towards the cutting die assembly 12 with adjustable stops 147 positioned in the path of the edge of the mounting plate 131 so as to force the plate 131 back against the action of the compression springs 145, 145′ and cause the cam arm 119′ to be rotated about the pin 132 by engagement of the end 137 with the follow 140 which pulls the vacuum cups 116 and 116′ down onto the tops of the packages as they are moved into position above the same. The end 137 of cam arm 119′ is urged downwardly by a compression spring 148 (FIGURES 13 and 14) which is mounted on the top portion of a headed pin 150 which is upstanding from the mounting plate 131 and which carries a stop collar 151 for limiting the downward movement of the cam arm end 137.

The base plate 142 is mounted so that the vertical position thereof relative to the reciprocating slides 25 and 25′ can be adjusted to adapt the machine to the handling of packages of varying height. The plate 142 is bolted at its opposite ends to vertically disposed screws or threaded posts 155 (FIGURE 13), which are carried in threaded engagement in downwardly opening threaded bores 156 in nut forming members 157. The members 157 are rotatably mounted in block members 158 which are bolted to the vertically disposed side plates 160 and 160′, the latter plates being attached to the ends of the slide bars 25 and 25′ and connected by a cross bar 161 so as to form the frame for the carriage 16. The nut forming threaded members 157 are held against vertical movement in the supporting blocks 158 by thumb screws 162 and 162′, the inner ends of which are seated in circumferential grooves 163 on the exterior surface of the nut members 157. The nut members 157 carry on their upper end sprockets 164 and 164′ and these sprockets are connected by a movement equalizing chain 165. A tool receiving socket 166 may be provided in the top end of the member 157 to rotate the same for adjustment of the level of the arm and vacuum cup assembly. A bracket forming member 167 is attached to the edge of the mounting plate 131 and provided with a cam follower roller 168 mounted in a slot 170 (FIGURE 15) above the same for supporting the rear edge portion of the base plate 142 at the center of the carriage frame.

We claim:
1. Apparatus for separating individual packages from an assembly thereof which is characterized by a plurality of package units each of which includes a base forming portion and a body portion upstanding from the base portion with the latter having its margins extended and constituting a marginal flange which is in the plane of the base portion and which is integral with corresponding portions of adjoining units in the assembly, said apparatus comprising a supporting frame having a horizontally disposed table formation, means for intermittently advancing package assemblies along the table to a cutting station, a cutting die assembly mounted for vertical reciprocation at said cutting station, cutting members of cross-like configuration on said cutting die assembly providing cutting blades having paired, back-to-back generally U-shaped configuration for partially trimming the flange forming material about certain of the packages in a package assembly so as to free leading packages which have been partially trimmed by a previous reciprocation of said cutting die assembly, and means for delivering the packages as they are freed by reciprocation of the trimming die assembly for removal from the apparatus.

2. Apparatus as set forth in claim 1 wherein the cutting die assembly includes laterally spaced cutting members for trimming side portions of the package assembly.

3. Apparatus for separating individual packages from an assembly thereof which is characterized by a plurality of package units each of which includes a base forming portion and a body portion upstanding from the base portion with the latter having its margins extended and constituting a marginal flange which is in the plane of the base portion and which is integral with corresponding portions of adjoining units in the assembly, said apparatus comprising a supporting frame having a horizontally disposed table formation, means for intermittently advancing package assemblies along the table to a cutting station, a cutting die assembly mounted for vertical reciprocation at said cutting station, cutting members on said cutting die assembly for partially trimming the flange forming material about certain of the packages in a package assembly so as to free leading packages which have been partially trimmed by a previous reciprocation of said cutting die assembly, said cutting die assemble including a pair of laterally spaced, parallel cutting members disposed along the sides of the table for trimming opposite side margins of the package assembly, and means for delivering the packages as they are freed by reciprocation of the trimming die assembly for removal from the apparatus.

4. Apparatus for separating individual packages from an assembly thereof which is characterized by a plurality of package units each of which includes a base forming portion and a body portion upstanding from the base portion with the latter having its margins extended and constituting a marginal flange which is in the plane of the base portion and which is integral with corresponding portions of adjoining units in the assembly, said apparatus comprising a supporting frame having a horizontally disposed table formation, means for intermittently advancing package assemblies along the table to a cutting station, a cutting die assembly mounted for vertical reciprocation at said cutting station, cutting members on said cutting die assembly for partially trimming the flange forming material about certain of the packages in a package assembly so as to free leading packages which have been partially trimmed by a previous reciprocation of said cutting die assembly, said cutting die assembly including a hole punch disposed adjacent the flange trimming members which is operative to punch a hole in the trailing portion of the marginal flange for receiving a support member to enable the package to be suspended for display, and means for delivering the packages as they are freed by reciprocation of the trimming die assembly for removal from the apparatus.

5. Apparatus as set forth in claim 4 wherein said hole punch has an associated spring pressed stripper member mounted thereon for holding the package assembly on the table while the punch is separated therefrom by retraction of the die assembly.

6. Apparatus as set forth in claim 1 and means in the table at the cutting station for locating the individual packages in predetermined relation in the path of the cutting die assembly.

7. Apparatus as set forth in claim 6 and said package locating means comprising a pair of locating pins and a mounting block having guideways therein for receiving the pins, spring retracting means for said pins and air operated means for projecting the pins so that free ends thereof extend above the table and engage portions of a package assembly.

8. Apparatus as set forth in claim 6 and said means for advancing the package assemblies comprising a support frame mounted for longitudinal reciprocation and having package engaging fingers, and longitudinal guide slots in said table for permitting said package engaging fingers to be reciprocated by movement of said support frame in parallel longitudinal paths.

9. Apparatus as set forth in claim 8 and said package engaging fingers being pivotally mounted on said support frame and having a beveled top surface arranged so that they are operative to push the package assemblies in the forward direction only.

10. Apparatus for separating individual packages from an assembly thereof which is characterized by a plurality of package units arranged in longitudinal and transverse rows, each of which includes a base forming portion and a body portion upstanding from the base portion, the latter having marginal portions thereof, when the packages are separated, constituting a marginal flange of substantial width extending outwardly of the periphery of the body portion approximately in the plane of the base portion, said apparatus comprising an upright support frame having a horizontally disposed table, means for intermittently advancing successive package assemblies along the table to a position beneath a vertically reciprocating cutting die assembly, means for intermittently reciprocating said cutting die assembly, cutting members on said cutting die assembly having a cutting blade configuration comprising a plurality of U-shapes arranged so that upon each reciprocation of said die assembly it will partially trim the connecting base material about the trailing ends of the packages in the leading row of each successive package assembly or portion thereof and about the leading ends of the next succeeding row of packages so as to free the leading packages successively, and means for advancing the packages as they are freed by the reciprocation of the trimming die assembly to a discharge position for removal from the apparatus.

11. Apparatus for separating individual packages from an assembly thereof which is characterized by a plurality of package units arranged in longitudinal and transverse rows, each of which includes a base forming portion and a body portion upstanding from the base portion, the latter having marginal portions thereof, when the packages are separated, constituting a marginal flange of substantial width extending outwardly of the periphery of the body portion approximately in the plane of the base portion, said apparatus comprising an upright support frame having a horizontally disposed table, means for intermittently advancing successive package assemblies along the table to a position beneath a vertically reciprocating cutting die assembly, means for intermittently reciprocating said cutting die assembly, cutting members on said cutting die assembly operative upon each reciprocation thereof to partially trim the connecting base material about the trailing ends of the packages in the leading row of each successive package assembly or portion thereof and about the leading ends of the next succeeding row of packages so as to free the leading packages successively, means for advancing the packages as they are freed by the reciprocation of the trimming die assembly to a discharge position for removal from the apparatus, said means for advancing the package assemblies comprising a support frame mounted for reciprocation longitudinally of the table with means forming pusher fingers thereon to engaging trailing portions of the package assemblies so as to advance the same, and means carried on said pusher fingers support frame for gripping the leading packages as they are freed by the reciprocation of the cutting die assembly and for advancing the freed packages out of the path of said cutting die assembly.

12. Apparatus as set forth in claim 11 and said means for gripping the leading packages being pivotally mounted on a cross frame for swinging movement toward and from the end of the table beneath the cutting die assembly.

13. Apparatus as set forth in claim 11 and said means for gripping the leading packages being adjustable so as to accommodate packages of different size.

14. In an apparatus for trimming about the margins of individual packages in a multi-package assembly in which the packages are connected by portions of bottom closing sheet material which extend about the margins of each package so as to enable the packages to be cut apart with each package including a peripheral bottom flange, a table for supporting successive package assemblies at a cutting station, a reciprocably mounted cross frame having means for moving successive package assemblies along said table to said cutting station, a reciprocably mounted die assembly having cutting members for trimming about the margins of each package so as to cut each package free of the assembly, a package discharging mechanism mounted on said cross frame for gripping successive packages at said cutting station and means for operating said package discharging mechanism so as to grip packages which are freed by operation of the cutting members and discharge the same from the cutting station.

15. In an apparatus as set forth in claim 14 wherein said package discharging mechanism comprises vacuum cup members, supporting arms for said cup members, a pivot on which said supporting arms are swingably mounted, means connecting a vacuum line to said cup members, cam means for swinging said arms into and out of gripping engagement with the packages and control means in said vacuum line which is operative in timed relation to the movement of said cup members.

16. In an apparatus for trimming about the margins of individual packages in a multi-package assembly in which the packages are connected by portions of bottom closing sheet material which extend about the margins of each package so as to enable a peripheral bottom flange to be cut therefrom, a table for supporting successive package assemblies at a cutting station, a reciprocably mounted die assembly having cutting members for trimming about the margins of each package, a package discharging mechanism mounted for package gripping and carrying movement adjacent the cutting station and means for operating said package discharging mechanism so as to grip packages which are freed by operation of the cutting members and move the same from the cutting station, wherein said package discharging mechanism comprises vacuum cup members, supporting arms for said cup members, a pivot on which said supporting arms are swingably mounted, a reciprocably mounted cross frame on which said pivot is mounted, means connecting a vacuum line to said cup members, cam means for swinging said arms into and out of gripping engagement with the packages and control means in said vacuum line which is operative in timed relation to the movement of said cup members, and means provided on said cross frame for adjusting the position of said pivot so as to vary the path of movement of said cup members and accommodate packages of different size.

17. In an apparatus for trimming about the margins of individual packages in a multi-package assembly in which the packages are connected by portions of bottom closing sheet material which extend about the margins of each package so as to enable a peripheral bottom flange to be cut therefrom, a table for supporting successive package assemblies at a cutting station, a reciprocably mounted die assembly having cutting members for trimming about the margins of each package, a package discharging mechanism mounted for package gripping and carrying movement adjacent the cutting station and means for operating said package discharging mechanism so as to grip packages which are freed by operation of the cutting members and move the same from the cutting station, wherein said package discharging mechanism comprises vacuum cup members, supporting arms for said cup members, a pivot on which said supporting arms are swingably mounted, a reciprocably mounted cross frame on which said pivot is mounted, means connecting a vacuum line to said cup members, cam means for swinging said arms into and out of gripping engagement with the packages and control means in said vacuum line which is operative in timed relation to the movement of said cup members, and said package discharging mechanism including an automatic height compensating means whereby to facilitate the handling of packages of non-uniform height.

18. In an apparatus as set forth in claim 14 wherein said package discharge mechanism comprises a pivot shaft supported on said cross frame, vacuum cups mounted on the ends of supporting arms which are mounted on said pivot shaft, a vacuum line connected to said cups, and vacuum control means in said vacuum line, means for reciprocating said cross frame so as to move said vacuum cups into package gripping position, and means to swing said supporting arms on said pivot shaft into and out of package engagement in timed relation to the movement of said cross frame.

19. In an apparatus as set forth in claim 14 wherein said package discharge mechanism includes swingably mounted arms having vacuum cups on the free ends thereof, means operative to swing said arms so as to bring the vacuum cups into gripping engagement with packages disposed beneath the cutting die assembly when said die assembly is retracted to a non-cutting position and to remove the packages therefrom, and means to connect said cups with a vacuum line having control means which is operated in timed relation to the movement of said die assembly.

References Cited

UNITED STATES PATENTS

| | | | |
|---|---|---|---|
| 2,386,147 | 10/1945 | Sidebotham | 83—45 X |
| 2,976,658 | 3/1961 | Kostor. | |
| 2,997,907 | 8/1961 | Constantino | 83—140 X |
| 3,124,988 | 3/1964 | Albert | 83—152 X |
| 3,185,006 | 5/1965 | Mercer et al. | 83—408 X |

JAMES M. MEISTER, Primary Examiner

U.S. Cl. X.R.

83—132, 140, 152, 255, 278, 418, 620, 694